US009569224B2

(12) United States Patent
Little et al.

(10) Patent No.: US 9,569,224 B2
(45) Date of Patent: Feb. 14, 2017

(54) SYSTEM AND METHOD FOR ADAPTIVELY INTEGRATING A DATABASE STATE NOTIFICATION SERVICE WITH A DISTRIBUTED TRANSACTIONAL MIDDLEWARE MACHINE

(71) Applicant: Oracle International Corporation, Redwood Shores, CA (US)

(72) Inventors: Todd J. Little, Palatine, IL (US); Qingsheng Zheng, Beijing (CN); Xugang Shen, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/603,108

(22) Filed: Jan. 22, 2015

(65) Prior Publication Data
US 2015/0324222 A1    Nov. 12, 2015

Related U.S. Application Data

(60) Provisional application No. 61/989,323, filed on May 6, 2014.

(51) Int. Cl.
| | | |
|---|---|---|
| *G06F 9/46* | (2006.01) | |
| *G06F 9/44* | (2006.01) | |
| *H04L 29/08* | (2006.01) | |
| *G06F 17/30* | (2006.01) | |

(52) U.S. Cl.
CPC ............ *G06F 9/44* (2013.01); *G06F 9/466* (2013.01); *G06F 17/30575* (2013.01); *H04L 29/08* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,283,897 | A | 2/1994 | Georgiadis |
| 6,182,086 | B1 | 1/2001 | Lomet |
| 6,209,018 | B1 | 3/2001 | Ben-Shachar |
| 6,209,038 | B1 | 3/2001 | Bowen |
| 6,424,992 | B2 | 7/2002 | Devarakonda |

(Continued)

OTHER PUBLICATIONS

Oracle, "Achieving High Availability with Oracle Tuxedo." Oracle. N.p., Jul. 2012. Web. Apr. 2, 2016. <http://www.oracle.com/technetwork/middleware/tuxedo/overview/tuxedo-ha-wp-2008-130747.pdf>.*

(Continued)

*Primary Examiner* — Wei Zhen
*Assistant Examiner* — Binh Luu
(74) *Attorney, Agent, or Firm* — Tucker Ellis LLP (57) ABSTRACT

A system and method can handle various database state notifications in a transactional middleware machine environment. The system can connect one or more transaction servers to a database service, wherein the database service is associated with a notification service. Furthermore, a notification service client that is associated with said one or more transaction servers can receive one or more events from the notification service, wherein said one or more events indicates one or more state changes in the database service. Then, one or more transaction servers operate to adaptively respond to the one or more state changes in the database service.

20 Claims, 5 Drawing Sheets

(56) References Cited

U.S. PATENT DOCUMENTS

| | | |
|---|---|---|
| 6,560,609 B1 | 5/2003 | Frey |
| 6,671,686 B2 | 12/2003 | Pardon |
| 6,745,387 B1 | 6/2004 | Ng |
| 6,799,172 B2 | 9/2004 | Candee |
| 6,823,514 B1 | 11/2004 | Degenaro |
| 6,922,724 B1* | 7/2005 | Freeman ............... G06F 9/505 709/223 |
| 6,981,256 B2 | 12/2005 | Jawahar |
| 7,058,629 B1 | 6/2006 | Colrain et al. |
| 7,069,317 B1 | 6/2006 | Colrain et al. |
| 7,284,018 B1 | 10/2007 | Waldorf |
| 7,337,441 B2 | 2/2008 | Felt |
| 7,376,953 B2 | 5/2008 | Togasaki |
| 7,389,514 B2 | 6/2008 | Russell |
| 7,444,335 B1 | 10/2008 | Colrain et al. |
| 7,584,474 B2 | 9/2009 | Gondi |
| 7,640,545 B2 | 12/2009 | Kumar |
| 7,676,810 B2 | 3/2010 | Tankov |
| 7,814,065 B2 | 10/2010 | Chan |
| 7,937,611 B2* | 5/2011 | Gatev ............... G06F 11/1443 709/203 |
| 7,996,837 B2 | 8/2011 | Chesebro |
| 8,001,546 B2 | 8/2011 | Felt |
| 8,131,872 B2 | 3/2012 | Kennedy |
| 8,336,053 B2 | 12/2012 | Burghard |
| 8,433,809 B2 | 4/2013 | Dor |
| 8,499,298 B2 | 7/2013 | Mitchell |
| 8,578,390 B2 | 11/2013 | Dillow |
| 8,635,185 B2 | 1/2014 | Somogyi |
| 8,898,277 B2 | 11/2014 | Chen |
| 9,027,026 B2 | 5/2015 | Zhelev |
| 2003/0050972 A1 | 3/2003 | Felt |
| 2003/0177182 A1 | 9/2003 | Clark |
| 2007/0030853 A1 | 2/2007 | Rogers |
| 2008/0177879 A1 | 7/2008 | Krishnan |
| 2008/0243865 A1 | 10/2008 | Hu |
| 2009/0157766 A1* | 6/2009 | Shen ............... G06F 11/2097 |
| 2009/0172689 A1* | 7/2009 | Bobak ............... G06F 9/5061 718/104 |
| 2009/0235255 A1 | 9/2009 | Hu |
| 2009/0296711 A1 | 12/2009 | Kennedy |
| 2011/0231510 A1* | 9/2011 | Korsunsky ............... G06F 21/55 709/213 |
| 2012/0005330 A1 | 1/2012 | Moran |
| 2012/0047394 A1* | 2/2012 | Jain ............... G06F 11/2028 714/4.11 |
| 2012/0246220 A1 | 9/2012 | Wang |
| 2012/0284723 A1 | 11/2012 | Burgess |
| 2013/0024863 A1 | 1/2013 | Parkinson |
| 2013/0054600 A1* | 2/2013 | Somogyi ............ G06F 17/30575 707/737 |
| 2013/0086238 A1* | 4/2013 | Li ............... G06F 9/505 709/223 |
| 2013/0246368 A1 | 9/2013 | Parkinson |
| 2013/0246379 A1 | 9/2013 | Shen |
| 2015/0149835 A1* | 5/2015 | Jayaraman ............ G06F 11/008 714/48 |
| 2016/0062854 A1* | 3/2016 | Allen ............... G06F 11/2007 714/4.11 |

OTHER PUBLICATIONS

Oracle, "Load Balancing in Oracle Tuxedo ATMI Applications." Oracle. N.p., Jul. 2012. Web. Apr. 2, 2016. <http://www.oracle.com/technetwork/middleware/tuxedo/overview/ld-balc-in-oracle-tux-atmi-apps-1721269.pdf>.*

International Searching Authority at the European Patent Office, International Search Report and Written Opinion for PCT International Patent Application No. PCT/US2015/023120, Jun. 22, 2015, 8 pages.

Mariela Curiel et al., "Modeling Overhead in Servers with Transactional Workloads", IEEE 1999, pp. 182-189.

H. Shrikumar, "Transactional Filer for Grid Storage Server", IEEE © 2005, pp. 422-431.

Oracle Solaris an Oracle White Paper "Effective Resource Management Using Oracle Database Resource Manager" Jun. 2011, 24 pages.

Sangman Kim et al., "Improving Server Applications Wtih System Transactions", Copyright © ACM, pp. 15-28.

Francesco Quaglia et al., "Reliability in Three Tier Systems Without Application Server Coordination and Persistent Message Queues", Copyright © 2005, ACM Symposium on Applied Computing, pp. 718-723.

Torsten Grabs et al., "XMLTM: Efficient Transaction Management for XML Documents", Copyright © 2002, ACM, pp. 142-152.

Florian Irmert et al., "Semantics of a Runtime Adaptable Transaction Manager", Copyright © 2009, ACM, pp. 88-96.

Benchaphon Limthanmaphon et al., "Web Service Composition Transaction Management", Copyright © 2004, Australian Computer Society, Inc. Fifteenth Australasian Database Conference (ADC2004), Dunedin, New Zealand, Conferences in Research and Practice in Information Technology, vol. 27, pp. 171-179.

M. Fazio et al., "Virtual Resource Management Based on Softward Transactional Memory", 2011 First International Symposium on Network Cloud Computing and Applications, Copyright © 2011, IEEE, pp. 1-8.

United States Patent and Trademark Office, Notice of Allowance and Fee(s) Due Dated Nov. 3, 2016 for U.S. Appl. No. 14/587,476, 21 Pages.

Lundhild, Barb et al., "Best Practices for Using XA Wtih RAC" Copyright ® 2006 Oracle Real Application Clusters Version 2.0, 14 Pages.

Harizopoulos, Stavros et al., "Affinity Scheduling in Staged Server Architectures" Mar. 2002, CMU-CS-02-113, School of Computer Science Carnegie Mellon University, 22 Pages.

* cited by examiner

SYSTEM AND METHOD FOR ADAPTIVELY INTEGRATING A DATABASE STATE NOTIFICATION SERVICE WITH A DISTRIBUTED TRANSACTIONAL MIDDLEWARE MACHINE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims priority on U.S. Provisional Patent Application No. 61/989,323, entitled "ADAPTIVELY INTEGRATING A DATABASE STATE NOTIFICATION SERVICE WITH A DISTRIBUTED TRANSACTIONAL MIDDLEWARE MACHINE," by inventors Todd Little, Qingsheng Zhang, and Xugang Shen, filed May 6, 2014, which application is herein incorporated by reference.

CROSS REFERENCE TO RELATED APPLICATIONS

This application is related to the following patent applications, each of which is hereby incorporated by reference in its entirety:

U.S. patent application Ser. No. 14/587,468 filed Dec. 31, 2014 entitled "SYSTEM AND METHOD FOR SUPPORTING COMMON TRANSACTION IDENTIFIER (XID) OPTIMIZATION BASED ON RESOURCE MANAGER (RM) INSTANCE AWARENESS IN A TRANSACTIONAL ENVIRONMENT"; and U.S. patent application Ser. No. 14/587,474 filed Dec. 31, 2014 entitled "SYSTEM AND METHOD FOR SUPPORTING RESOURCE MANAGER (RM) INSTANCE AWARENESS IN A TRANSACTIONAL ENVIRONMENT"; and U.S. patent application Ser. No. 14/587,476 filed Dec. 31, 2014 entitled "SYSTEM AND METHOD FOR SUPPORTING TRANSACTION AFFINITY BASED ON RESOURCE MANAGER (RM) INSTANCE AWARENESS IN A TRANSACTIONAL ENVIRONMENT".

FIELD OF INVENTION

The present invention is generally related to computer systems and software, and is particularly related to a transactional middleware machine environment.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the general areas that embodiments of the invention are intended to address.

SUMMARY

Described herein are systems and methods that can handle various database state notifications in a transactional middleware machine environment. The system can connect one or more transaction servers to a database service, wherein the database service is associated with a notification service. Furthermore, a notification service client that is associated with said one or more transaction servers can receive one or more events from the notification service, wherein said one or more events indicates one or more state changes in the database service. Then, said one or more transaction servers operate to adaptively respond to the one or more state changes in the database service.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Tuxedo environment as an example for a transactional middleware machine environment. It will be apparent to those skilled in the art that other types of transactional middleware machine environments can be used without limitation.

Described herein are systems and methods that can handle various database state notifications in a transactional environment, such as a transactional middleware machine environment.

Transactional Middleware Machine Environment

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, the system provides an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, a transactional middleware system, such as the Oracle Tuxedo system, can take advantage of fast machines with multiple processors, such as an Oracle Exalogic middleware machine, and a high performance network connection, such as an IB network. Additionally, the Oracle Tuxedo system can take advantage of a clustered database, such as the Oracle Real Application Clusters (RAC) Enterprise database, which is a clustered database with shared cache architecture and can be a component of a cloud architecture. The Oracle RAC can overcome the limitations of traditional shared-nothing and shared-disk approaches to provide highly scalable and available database solutions for business applications.

In accordance with an embodiment of the invention, Oracle Tuxedo system provides a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

Additionally, the Oracle Tuxedo system can comply with the Open Group's X/Open standards, including the support of the XA standard for two-phase commit (2PC) processing, the X/Open ATMI API, and the X/Open Portability Guide (XPG) standards for language internationalization. The transactional application server (transaction server) can be referred to as an XA server, when it uses the XA standard. For example, each Tuxedo application server that belongs to a Tuxedo group can be configured using an OPENINFO property. All XA servers in a Tuxedo group can use the OPENINFO property to establish the connection to a resource manager (RM).

Database State Notification Integration

Figure 1:
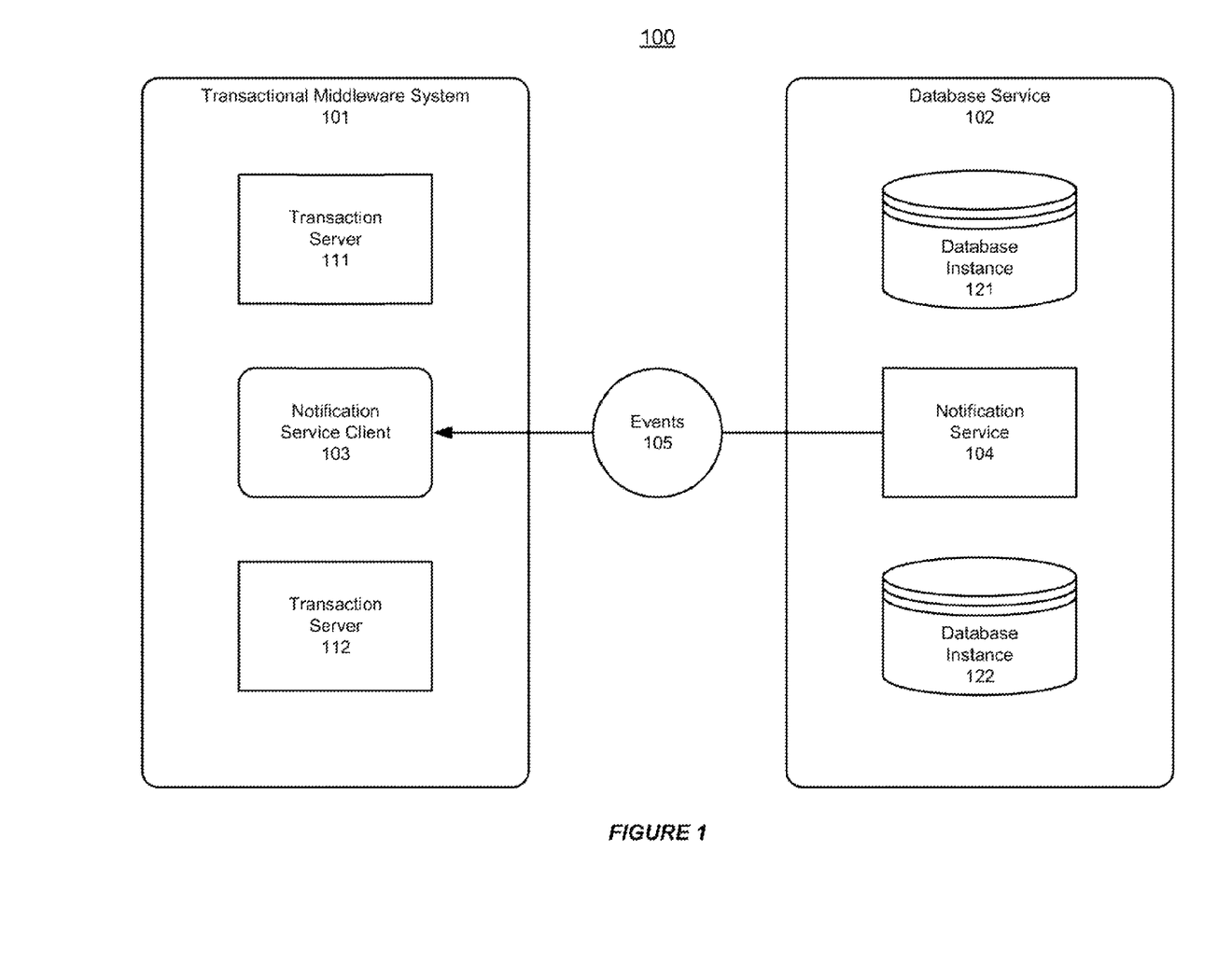
FIG. 1 shows an illustration of supporting database state notification integration in a transactional middleware environment, in accordance with an embodiment of the invention.

FIG. 1 shows an illustration of supporting database state notification integration in a transactional middleware machine environment 100, in accordance with an embodiment of the invention. As shown in FIG. 1, a transactional middleware system 101, which includes one or more transaction servers 111-112, can adaptively respond to state changes in a database service 102, which may include one or more database instances 121-122.

Furthermore, the database service 102 can use a notification service 104 to publish the events 105, in order to notify other processes about the configuration and service level information (including various types of service status change information).

When the transactional middleware system 101 connects with the database service 102, the transactional middleware system 101 can use a notification service client 103 to receive the various events 105 from the notification service 104 that is associated with the database service 102. Then, the applications in the transactional middleware system 101 can respond immediately to the database service state changes.

For example, Oracle RAC can use the Oracle Notification Service (ONS) to publish the fast application notification (FAN) events. When an Oracle Tuxedo system connects with an Oracle Database service, which may include multiple Oracle RAC clusters, the Oracle Tuxedo system can receive the FAN events from the ONS. These FAN events can include UP or DOWN events that apply to different databases, instances, services, and nodes. Then, the Tuxedo applications can respond to the FAN events accordingly.

In accordance with an embodiment of the invention, the transactional middleware system 101 can support various features, such as fast connection failover (FCF), runtime connection load balancing, and graceful handling for database service outages.

Furthermore, the transactional middleware system 101 can improve the performance of various transactional applications, by capturing and reporting various issues that are associated with using the traditional relational database management system (RDBMS) performance methodologies.

For example, by taking advantage of the database state notification integration in the transactional middleware system 101, the transactional middleware system 101 can avoid waiting for transmission control protocol/internet protocol (TCP/IP) time-outs when a node fails without closing sockets (such a failure may potentially affect every subsequent connection while the IP address is down). Additionally, the system can avoid attempting to connect to the database services when the services are not available. Also, the system can avoid processing the last result at the client when the server goes down, and can avoid attempting to execute work on slow, hung, and dead nodes. Moreover, the system can connect to the database services when the database services are resumed after an outage.

In accordance with an embodiment of the invention, the transactional middleware system 101 can support a connection steering feature, which can guide the transaction servers 111-112 to establish connections to the specific database instance 121 or 122 based on various database state notification events 105, such as the high availability (HA) events. Thus, the system can direct the application users, requesting for connections, only to the database instances that are available.

Figure 2:
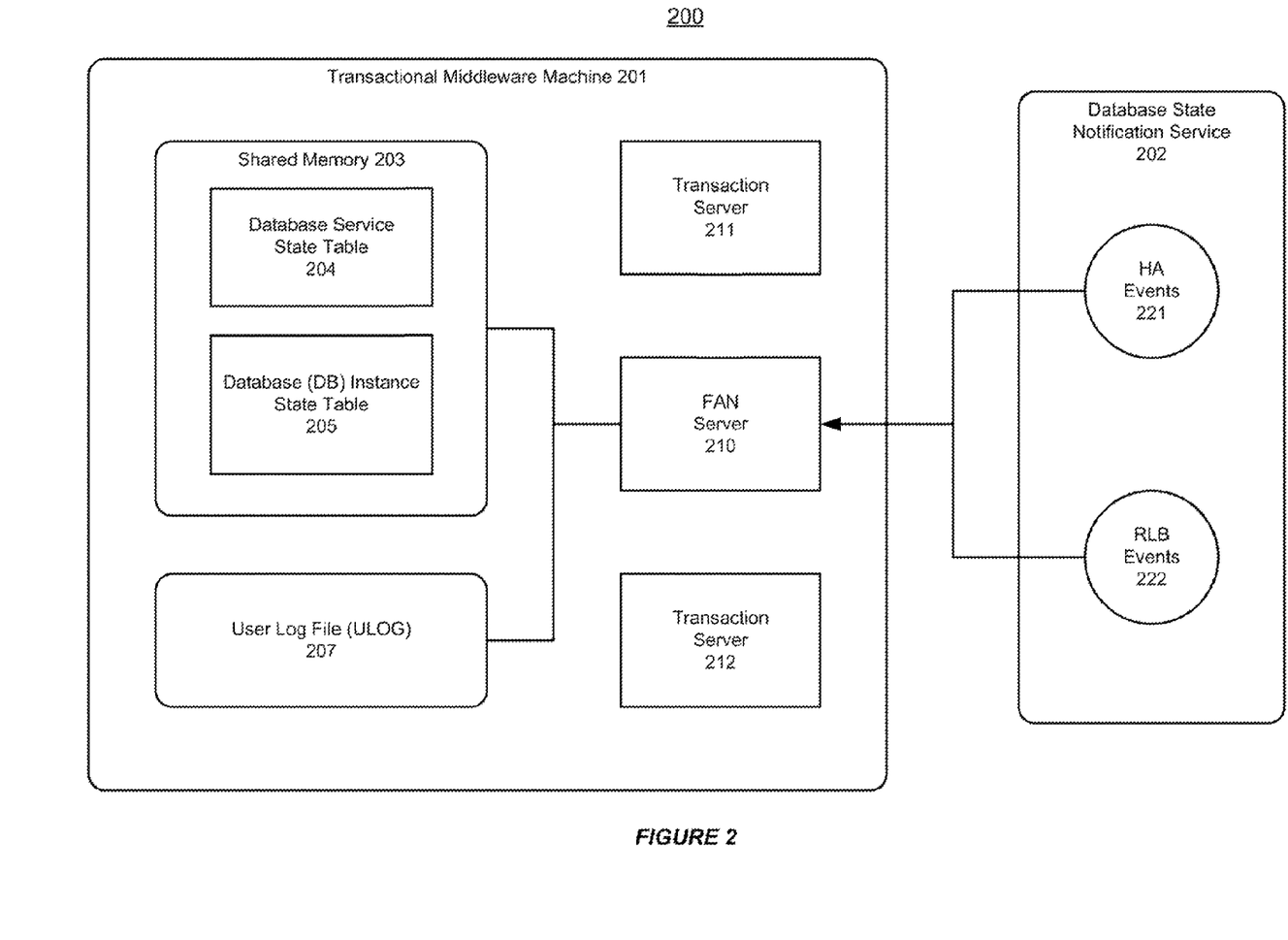
FIG. 2 shows an illustration of handling various database state notification events in a transactional middleware environment, in accordance with an embodiment of the invention.

FIG. 2 shows an illustration of handling various database state notification events in a transactional middleware environment 200, in accordance with an embodiment of the invention. As shown in FIG. 2, a transaction middleware machine 201, which includes one or more transaction servers 211-212, can use a notification service client (such as a FAN server 210) to receive various events, which are published by the database state notification service 202.

For example, in Tuxedo, the FAN server 210 (e.g. a TMFAN server) can be a system-supplied server that is capable of handling the FAN events received from the Oracle RAC. Also, the FAN server 210 can connect to a notification service server (e.g. an ONS server) directly as a remote client, even when the notification service server is not on the same node with the client. Alternatively, the FAN server 210 can connect to the notification service server, via a daemon (e.g. an ONS daemon) on the client side, when the notification service server is not on the same node with the client.

When the Tuxedo system starts, the FAN server 210 can create a connection with the database state notification service 202 to receive various FAN events 221-222, such as the high availability (HA) events 221 and the runtime load balancing (RLB) events 222. Additionally, the FAN server 210 allows the user to check FAN events 221-222 related information in a user log file, e.g. the Tuxedo user log (ULOG) file 207.

Furthermore, the system allows a single FAN server 210 to receive notifications from multiple databases. Also, the system can prevent different instances of the FAN server 210 from receiving and dealing with the same notification(s).

In accordance with an embodiment of the invention, the FAN server 210 can be implemented using a main process and one or more receiving threads.

The following List 1 shows an exemplary implementation of the main process.

```
List 1 tpsrvinit{
    Read parameters
    Create one or more receive threads
}
_tmrunserver{
}
tpsrvdone{
    set down flags
    publish a down event
}
```

The following List 2 shows an exemplary implementation of a receiving thread.

```
List 2

Create a subscriber
While (!shutdown){
    Receive an event /*block time can be 5 sec*/
    If the event is a "down event"
        Break;
    Else
        Handle the event
}
```

As shown in the above, during the service initialization phase, the main process can read in various parameters and create the different receiving threads. Furthermore, each receiving thread can create a subscriber. Then, the receiving thread can receive and handle an event periodically (e.g. every five seconds), while the thread is up. Finally, to prepare for the shutdown of the service, the main process can set a down flag and publish a down event.

In accordance with an embodiment of the invention, the transactional middleware machine 201 can store the database service state information in a share memory 203, such as the Tuxedo Bulletin Board (BB).

As shown in FIG. 2, the FAN server 210 can create and maintain different state tables in the share memory 203. These tables can include a database service state table 204 and a database instance state table 205. Furthermore, the transactional middleware machine 201 can support the instance awareness feature and other related features based on these tables.

For example, in Tuxedo, the system can use the following function to create a RM state table 204, an instance state table 205 and a hostname table.

int_tmsmcinst(_TCADEF, struct tminstparms_t*instp, struct tmorainfo_t*orainfo)

Additionally, the FAN server 210 can create a new entry in the database service state table 204, the instance states table 205 and the hostname table, when it is needed. Also, the FAN server 210 can update and clean the database service state table 204, the instance states table 205 and the hostname table, when it is appropriate.

In Tuxedo, the FAN server 210 can be configured either as a native ONS client or a remote ONS client. If the FAN server 210 is configured as a native ONS client, the system can enable the ONS daemon on the client side, e.g. via a configuration file, while the ONS daemon on the database side is continually running. On the other hand, if the FAN server 210 is configured as a remote client, the system does not need to enable the ONS daemon on the client side. Instead, the system can set up various parameters based on different key words.

In accordance with an embodiment of the invention, the HA events 221 can include the up/down notification for a node, a database instance and/or a service in a database service. For example, in Oracle RAC, the services can be continuously available with loads shared across one or more instances. The high availability framework monitors the database and its services and sends event notifications using FAN events. When the database cluster configuration changes, the system can immediately publish a FAN event that indicates a state change occurs in the cluster. The Oracle RAC high availability framework can maintain service availability. Also, Oracle RAC can recover and balance services according to business rules and the service attributes.

By taking advantage of the database state notification integration in a transactional middleware environment, the system can support the fast connection failover (FCF) feature, which enables clients, mid-tier applications, and/or various programs that connect directly to a database to failover quickly and seamlessly to an available service when an old service becomes unavailable.

Using the FCF feature, the transaction middleware machine 201 can control the behavior of the transaction processor. For example, the application on the transaction servers 211-212 can poll the database and detect a problem, instead of waiting for the arrival of an event. Then, the system can react immediately after the transactional applications receives the FAN events 221-222. Also, the system can terminate the in-flight transactions immediately and notify the client when an instance fails.

Furthermore, the transaction middleware machine 201 can provide rapid failure detection. The system can ensure that the database connections are valid without the need to test the database connections. Also, the transaction middleware machine 201 can remove invalid database connections from the transaction servers and create valid database connections. If a transaction server cannot create a valid database connection, the system can remove the Tuxedo server from the routing list.

Additionally, the transaction middleware machine 201 can adapt to the changes in the database topology, such as adding or removing a node, and can distribute runtime work requests to all active database instances including the instances rejoining a cluster.

Moreover, the transaction middleware machine 201 can gracefully handle the planned and unplanned database service outages. For the planned shutdowns, the transaction server allows in-progress transactions to complete before closing connections. For the unplanned shutdowns, the transaction server can roll back the in-progress transactions and closes the connections. Thus, the new requests can be load balanced to active database instances for both the planned shutdowns and the unplanned shutdowns.

In accordance with an embodiment of the invention, the RLB events 222 can indicate the runtime load and affinity per database instance within a database service. The transactional middleware machine (transaction server) 201 can support runtime connection load balancing features, based on the RLB events 222 that are published by the database state notification service 202. The run-time connection load balancing features can enable the routing of work requests to an instance that offers the best performance and minimizes the need for relocating works.

For example, in Oracle RAC, a connection may belong to any instance that provides the relevant service. The approach of randomly retrieving a connection from the cache may not be appropriate, e.g. when one instance performs better than others, in which case the random selection of a connection is inefficient. In Tuxedo, the applications can take advantage of the load balancing advisory FAN events to direct work requests to the instance in the cluster that is currently providing the best service quality. Thus, Tuxedo can route request to the database instance with a light load.

Additionally, the database state notification service 202 can send the events periodically. The system can update load information on different instances, if the value of load information (new and old) exceeds a threshold value. Thus, the system can avoid constantly updating load information on different instances, since there can be potentially a large number of the RLB events.

Figure 3:
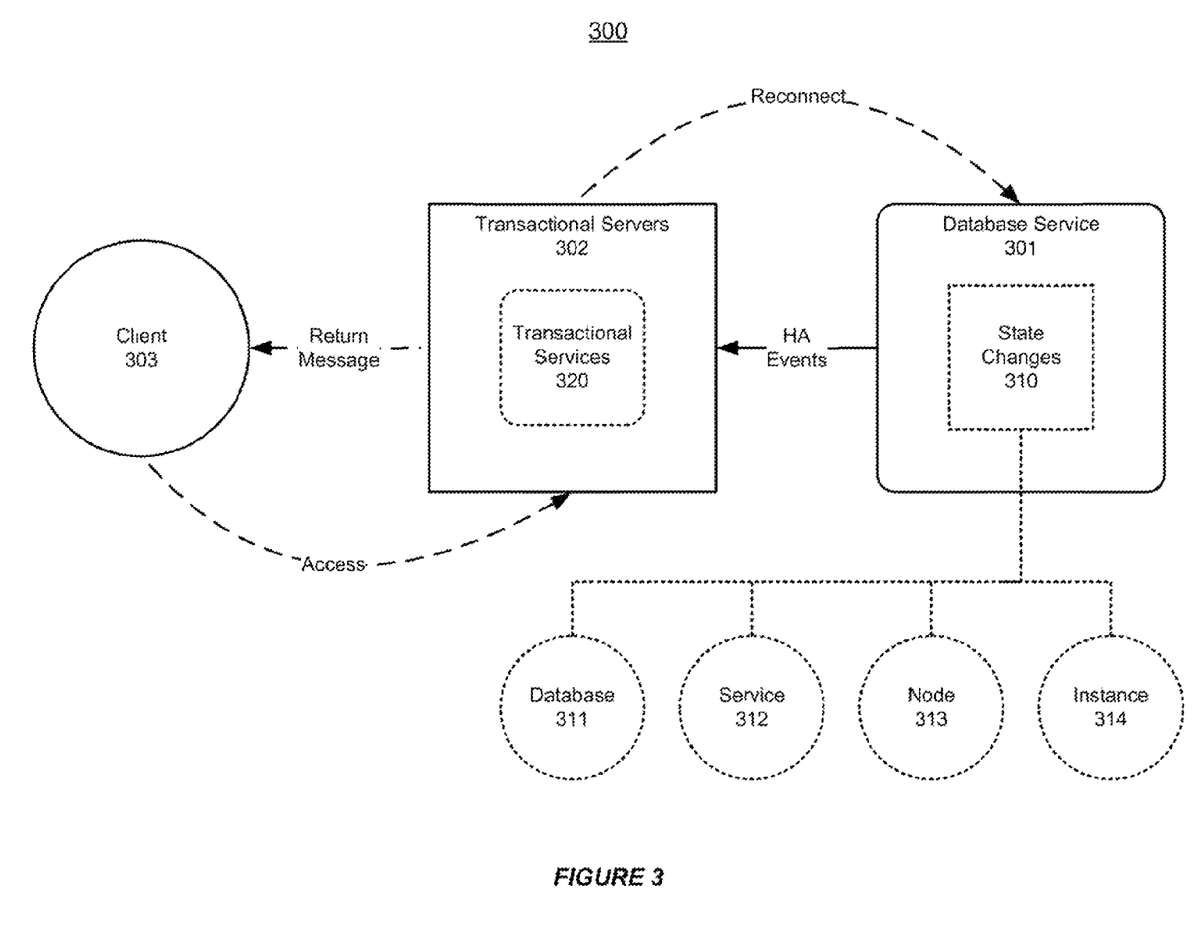
FIG. 3 shows an illustration of handling database high availability (HA) events in a transactional middleware environment, in accordance with an embodiment of the invention.

FIG. 3 shows an illustration of handling database high availability (HA) events in a transactional middleware environment 300, in accordance with an embodiment of the invention. As shown in FIG. 3, the transaction servers 302, which provides various transactional services 320 in a transactional middleware environment 300, can receive and handle HA events that are related to state changes 310 in a database service 301.

In accordance with an embodiment of the invention, the transaction servers 302 can handle various types of HA events, such as the UP events and DOWN events associated with the database service 301. Furthermore, these HA events can be applied to different scopes, such as the database 311, service 312, node 313, and instance 314 scopes.

For UP events, when services and instances are started, the system can create new database connections so that the application can immediately take advantage of the extra resources. On the other hand, for DOWN events, the system can minimize the disruption to the applications by terminating the sessions related to the failed instances or nodes. Also, the system can terminate the incomplete transactions and notifies the application users immediately afterwards.

For example, when a Tuxedo server receives an HA event, which indicates that the database status changes from UP to DOWN, the Tuxedo server can return a NOENTRY or RMERR message to the client 303.

When the Tuxedo server receives an HA event, which indicates that the service status changes from UP to USER DOWN and the instance status is UP, the Tuxedo server can be accessed but the tpopen( ) function call may return RMERR directly.

When the Tuxedo server receives an HA event, which indicates that the service status changes from UP to FAIL DOWN, the Tuxedo server can return a NOENTRY or RMERR message to the client 303.

When the Tuxedo server receives an HA event, which indicates that the service status changes from user DOWN to UP, the Tuxedo server can be accessed and the tpopen( ) function call can be performed.

When the Tuxedo server receives an HA event, which indicates that the service status changes from FAIL DOWN to UP, the Tuxedo server can reconnect to the database.

When the Tuxedo server receives an HA event, which indicates that the instance status changes from UP to DOWN and the instance status is UP, the Tuxedo server can reconnect to the database.

When a Tuxedo server receives an HA event, which indicates that a new instance is added in the database service, some Tuxedo servers can be reconnected to the new instances.

When the Tuxedo server receives an HA event, which indicates that the host status changes from UP to DOWN and the instance status is UP, the instance status changes from status changes from UP to DOWN, the Tuxedo server can reconnect to the database.

When the Tuxedo server receives an HA event, which indicates that the service status changes from UP to DOWN and the instance status changes from UP to DOWN, the Tuxedo server can return a NOENTRY or RMERR message to the client 303.

When the Tuxedo server receives an HA event, which indicates that the service status changes from UP to DOWN, the host status changes from UP to DOWN, or the instance status changes from UP to DOWN, the Tuxedo server can return a NOENTRY or RMERR message to the client 303.

Figure 4:
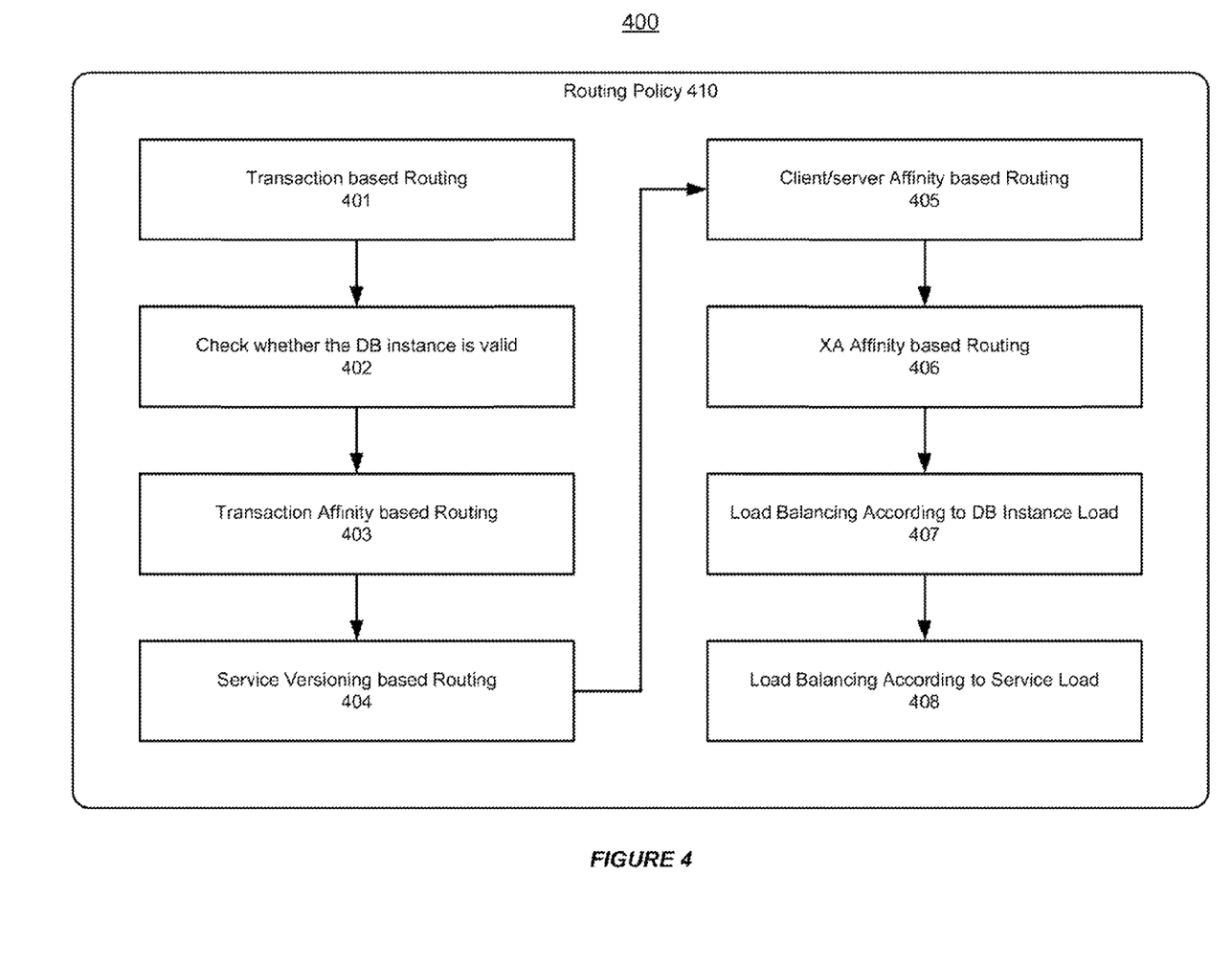
FIG. 4 shows an illustration of supporting service routing in a transactional middleware environment, in accordance with an embodiment of the invention.

FIG. 4 shows an illustration of supporting service routing in a transactional middleware environment 400, in accordance with an embodiment of the invention. As shown in FIG. 4, the transactional middleware environment 400 can be configured with a routing policy 410, which can take advantage of various database HA and RLB events.

At step 401, the system can perform a transaction based routing, e.g. the Tuxedo GWTDOMAIN transaction routing.

At step 402, the system can check whether a database instance that is associated with transaction server is valid. For example, the system can check the database service and instance status associated with a transaction server. If both the database service status and the instance status are shutdown (or failed), the system can remove the transaction server from the routing list.

At step 403, the system can perform the transaction affinity based routing (for different database instances). At step 404, the system can perform the service versioning based routing. At step 405, the system can perform the client/server affinity based routing. At step 406, the system can perform the XA affinity based routing.

At step 407, the system can perform load balancing according to the load on the different database instances. For example, if one database instance is invalid, the system can select the transaction server, which is associated with a valid database instance. Furthermore, the system can select a transaction server with a lighter database load from multiple transaction servers associated with the same database service.

Finally, at step 408, the system can perform load balancing according to the service load.

Figure 5:
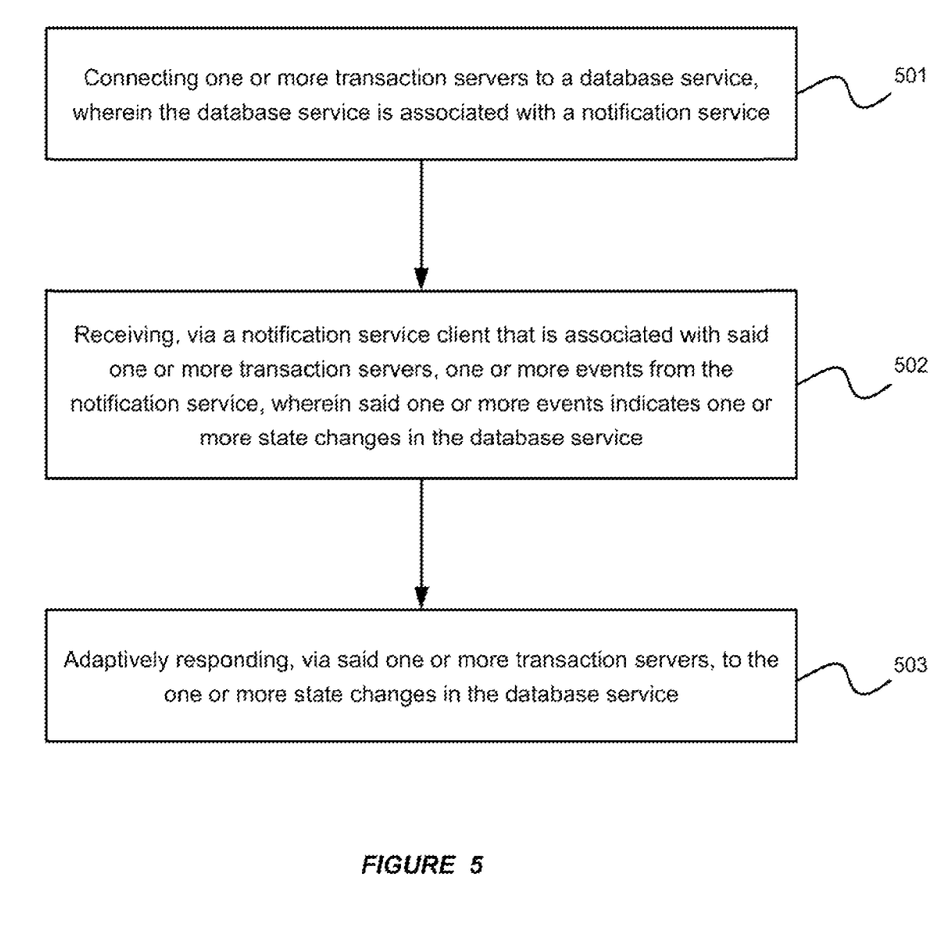
FIG. 5 illustrates an exemplary flow chart for supporting database state notification integration in a transactional middleware machine environment, in accordance with an embodiment of the invention.

FIG. 5 illustrates an exemplary flow chart for supporting database state notification integration in a transactional middleware machine environment, in accordance with an embodiment of the invention. As shown in FIG. 5, at step 501, the system connects one or more transaction servers to a database service, wherein the database service is associated with a notification service. Then, at step 502, a notification service client, which is associated with said one or more transaction servers, can receive one or more events from the notification service, wherein said one or more events indicates one or more state changes on the database service. Furthermore, at step 503, said one or more transaction servers can adaptively respond to the one or more state changes on the database service.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for handling various database state notifications in a transactional middleware machine environment, the method comprising:

connecting a plurality of transaction servers to a database service, wherein the database service is associated with a notification service;

providing an application notification server;

storing database service state information in a database state table in a shared memory using the application notification server;

receiving, with the application notification server, a plurality of events from the notification service, wherein said plurality of events indicate one or more state changes in the database service;

wherein said plurality of events comprise a plurality of high availability (HA) events, each of which indicates an up/down for at least one of a service, an instance, and a host node associated with the database service;

making a plurality of modifications to said database service state information stored in said state table using the application notification server in response to said plurality of events from the notification service;

polling said database service state information stored in said database state table using said plurality of transaction servers; and adaptively responding, with said plurality of transaction servers, to the plurality of modifications to said database state information stored in said database state table;

wherein said adaptively responding comprises rapid failure detection by said plurality of transaction servers in response to modifications to said database state information made in response to the plurality HA events which indicate a down without testing database connections, and removing one or more invalid database connections from said plurality of transaction servers to said database service and creating one or more valid database connections thereby supporting fast connection failover.

2. The method of claim 1, further comprising:
allowing the database service to be based on a clustered database that includes one or more databases, instances, host nodes, and services.

3. The method of claim 1, further comprising:
handling the plurality of events based on one or more routing policies.

4. The method of claim 1, wherein: adaptively responding, with said plurality of transaction servers, to the plurality of modifications to said database state information stored in said database state table, further comprises terminating in-flight transactions on said one or more invalid database connections.

5. The method of claim 1, further comprising:
allowing said plurality of events to include runtime load balance (RLB) events, each of which indicates a runtime load and affinity per database instance that is associated with the database service.

6. The method of claim 5, further comprising:
distributing runtime work requests to active database instances based on the RLB events.

7. The method of claim 1, further comprising:
providing with the application notification server a notification service client of the notification service of the database service.

8. The method of claim 1, further comprising:
providing with the application notification server a notification service client of the notification service of the database service; and
creating, via a main process of the application notification server, one or more receiving threads, each of which operates to receive and handle one or more events.

9. A system for handling various database state notifications in a transactional middleware machine environment, comprising:
a plurality of transaction servers each comprising a microprocessor and a memory, wherein the plurality of transaction servers are connected to a database service, wherein the database service is associated with a notification service;
an application notification server comprising a microprocessor and a memory;
wherein the application notification server is configured to store database service state information in a database state table in a shared memory;
wherein the application notification server is configured to receive a plurality of events from the notification service, wherein each of said plurality of events indicates one or more state changes in the database service;
wherein said plurality of events comprise a plurality of high availability (HA) events, each of which indicates an up/down for at least one of a service, an instance, and a host node associated with the database service;
wherein the application notification server is configured to make a plurality of modifications to said database service state information stored in said state table in response to said plurality of events received from the notification service;
wherein the plurality of transaction servers are configured to poll said database service state information stored in said database state table; and
wherein the plurality of transaction servers are configured to adaptively respond to the plurality of modifications to said database state information stored in said database state table;
wherein the plurality of transaction servers are configured to adaptively respond to the modifications to said database state information made in response to the plurality HA events which indicate a down without testing database connections, and support fast connection failover by removing one or more invalid database connections to said database service and creating one or more valid database connections to said database service.

10. The system according to claim 9, wherein:
the database service is based on a clustered database that includes one or more databases, instances, host nodes, and services.

11. The system of claim 9, wherein:
the system is configured to handle the plurality of events based on one or more routing policies.

12. The system of claim 9, wherein:
the plurality of transaction servers are further configured to adaptively respond to the plurality of modifications to said database state information stored in said database state table, by terminating in-flight transactions on said one or more invalid database connections.

13. The system of claim 9, wherein:
said plurality of events are runtime load balance (RLB) events, each of which indicates a runtime load and affinity per database instance that is associated with the database service.

14. The system of claim 13, wherein:
said plurality of transaction servers operates to distribute runtime work requests to active database instances based on the RLB events.

15. The system of claim 9, wherein:
the application notification server is configured to provide a notification service client of the notification service of the database service; and wherein a main process of the application notification server operates to create one or more receiving threads, each of which operates to receive and handle one or more events.

16. A non-transitory machine readable storage medium having instructions stored thereon for handling various database state notifications in a transactional middleware machine environment, which instructions, when executed, cause a system to perform steps comprising:
connecting a plurality of transaction servers to a database service, wherein the database service is associated with a notification service;
providing an application notification server;
storing database service state information in a database state table in a shared memory using the application notification server;
receiving, with the application notification server, a plurality of events from the notification service, wherein each of said plurality of events indicate one or more state changes in the database service;
wherein said plurality of events comprise a plurality of high availability (HA) events, each of which indicates an up/down for at least one of a service, an instance, and a host node associated with the database service;
making a plurality of modifications to said database service state information stored in said state table using the application notification server in response to said plurality of events from the notification service;
polling said database service state information stored in said database state table using said plurality of transaction servers; and
adaptively responding, with said plurality of transaction servers, to the plurality of modifications to said database state information stored in said database state table;

wherein said adaptively responding comprises rapid failure detection in response to modifications to said database state information made in response to the plurality HA events which indicate a down without testing database connections, and removing one or more invalid database connections from said plurality of transaction servers to said database service and creating one or more valid database connections thereby supporting fast connection failover.

17. The non-transitory machine readable storage medium of claim 16 wherein:
the database service is based on a clustered database that includes one or more databases, instances, host nodes, and services.

18. The non-transitory machine readable storage medium of claim 16 wherein said steps further comprise:
handling the plurality of events based on one or more routing policies.

19. The non-transitory machine readable storage medium of claim 16 wherein said steps further comprise:
adaptively responding, with said plurality of transaction servers, to the plurality of modifications to said database state information stored in said database state table, further comprises terminating in-flight transactions on said one or more invalid database connections.

20. The non-transitory machine readable storage medium of claim 16 wherein:
said plurality of events include runtime load balance (RLB) events, each of which indicates a runtime load and affinity per database instance that is associated with the database service.

* * * * *